US012756626B2

(12) United States Patent
Kulshreshtha et al.

(10) Patent No.: US 12,756,626 B2
(45) Date of Patent: Oct. 6, 2026

(54) AUTOMATIC IMPLEMENTATION OF CODE TO PROVIDE A COMMUNICATION SERVICE

(71) Applicant: Oracle International Corporation, Redwood City, CA (US)

(72) Inventors: Kinshuk Kulshreshtha, Kitchener (CA); Hon Sam Lee, Richmond Hill (CA)

(73) Assignee: Oracle International Corporation, Redwood City, CA (US)

( * ) Notice: Subject to any disclaimer, the term of this patent is extended or adjusted under 35 U.S.C. 154(b) by 214 days.

(21) Appl. No.: 18/512,480

(22) Filed: Nov. 17, 2023

(65) Prior Publication Data

US 2025/0168071 A1 May 22, 2025

(51) Int. Cl.
*H04L 41/0894* (2022.01)
*G06F 8/30* (2018.01)

(52) U.S. Cl.
CPC ............ *H04L 41/0894* (2022.05); *G06F 8/31* (2013.01)

(58) Field of Classification Search
None
See application file for complete search history.

(56) References Cited

U.S. PATENT DOCUMENTS

2009/0125877 A1* 5/2009 Kuzsma, Jr. .............. G06F 8/74 717/105
2012/0282586 A1* 11/2012 Cornell ..................... G06F 8/10 434/324
2013/0316737 A1* 11/2013 Guba .................... H04W 4/027 455/456.4
2021/0294679 A1* 9/2021 Thakur ................... G06F 8/315
2022/0286480 A1* 9/2022 Jadhav ..................... H04L 63/20
2023/0092752 A1* 3/2023 Balbi ...................... H04L 47/22 717/140
2024/0267361 A1* 8/2024 Weiss ...................... H04L 63/20

FOREIGN PATENT DOCUMENTS

CN 113326034 A * 8/2021 ............ G06F 8/315

OTHER PUBLICATIONS

International Search Report & Written Opinion for PCT/US2024/056217 mailed Mar. 12, 2025, Authorized Officer: Tobias Muller, 13 pages.

* cited by examiner

*Primary Examiner* — Ario Etienne
*Assistant Examiner* — Mohammad A. Mian

(57) ABSTRACT

The technology disclosed herein automatically creates code for both simple and complex policies to provide a communication service in accordance with those policies. In a particular example, a method includes receiving design policies for providing the communication service. The design policies include standard policies and complex policies. The method includes automatically generating the standard policy code with one or more decoupled extension points for implementing the standard policies. The method further includes providing the complex policies to a developer and receiving, from the developer, the complex policy code for implementing the complex policies. The method also includes inserting the complex policy code into the standard policy code at the decoupled extension points to generate communication service code and executing the communication service code to provide the communication service.

20 Claims, 7 Drawing Sheets

AUTOMATIC IMPLEMENTATION OF CODE TO PROVIDE A COMMUNICATION SERVICE

BACKGROUND

When a customer contacts a communication service provider to request a new communication service, that new communication service needs to be designed at the communication service provider to achieve the customer's desired results. The communication service provider may include many options and features for the communication service that will be incorporated into the service design. Those options and features may be limited by policies the service provider has for providing services. For instance, the service provider may include different Quality of Service (QOS) levels when providing a communication service depending on what QoS level a customer pays for. In that case, a policy will be implemented by the communication service provider to define the QoS provided for a customer's communication service. Some of these policies are simple in nature and can be configured by business users using no-code patterns, while others are complex policies that depend on collecting the data from multiple external systems before taking a decision. Typically, a developer will get involved to provide the proper code to design various resources that provide the service to implement the complex policy. For complex polices, the business intent is specified by the Business User and then the intent is communicated to the developers who write the code to implement the complex policy. Developers can be expensive and may take time to write the code. Even simple changes to a service provider's service design policies may, therefore, be an involved process.

SUMMARY

The technology disclosed herein automatically creates code for both simple and complex policies to provide a communication service in accordance with those policies. In a particular example, a method includes receiving design policies for providing the communication service. The design policies include standard policies and complex policies. The method includes automatically generating the standard policy code to implement the standard policies while including one or more decoupled extension points for implementing the complex policies. The method further includes providing the framework for complex policies to a developer and receiving, from the developer, the complex policy code for implementing the complex policies. The method also includes inserting the complex policy code into the standard policy code at the decoupled extension points to generate communication service code and executing the communication service code to provide the communication service.

In other examples, an apparatus performs the above-recited method and program instructions stored on computer readable storage media direct a processing system to perform the above-recited method.

DETAILED DESCRIPTION

The policy managers described below automatically generates computer code, just as Java code, to implement a communication service using resources of a communication service provider. A user may provide the design parameters and create the service model for the particular communication service desired by a customer. For example, communication service provider may provide broadband internet service to different customers. Each customer may have different requirements (i.e., design parameters). One customer may require one type of physical connection and a particular data transfer speed while another customer may require a different type of physical connection and a different data transfer speed. Parameters such as these are likely to be requested by many customers and can be enforced by what are referred to herein as standard policies. Standard policies are policies that most, if not all, customers will have implemented for their requested service and can be defined by a user (e.g., a service design agent for the service provider) by selecting predefined options for the standard policies. For instance, each broadband customer will need a physical connection for their broadband service. Thus, standard policies may include an option to select a desired type of physical connection (e.g., fiber optic or coax).

In many cases, a customer may have more nuanced wants or needs for their requested service. A policy for the customer's desires may not exist in the predefined list of standard policies. The user tasked with defining the service parameters may, therefore, have to describe what the customer wants implemented and rely on a developer to code the desired policies manually. Even if code for standard policies can be automatically generated, the manually coded complex policies must still be implemented alongside the standard policy code. The policy managers described below create code for implementing the communication service using both automatically generated code for the standard policies and manually generated code for the complex policies. The combined code for the communication service is structured such that the complex policy code can be modified without affecting the standard policy code and the standard policy code can be modified without affecting the complex policy code. Thus, if the customer requests a change to a standard policy, the standard policy code can be regenerated to include the change and the existing complex policy code can be merged without having to involve the developer of the complex policy code.

Figure 1:
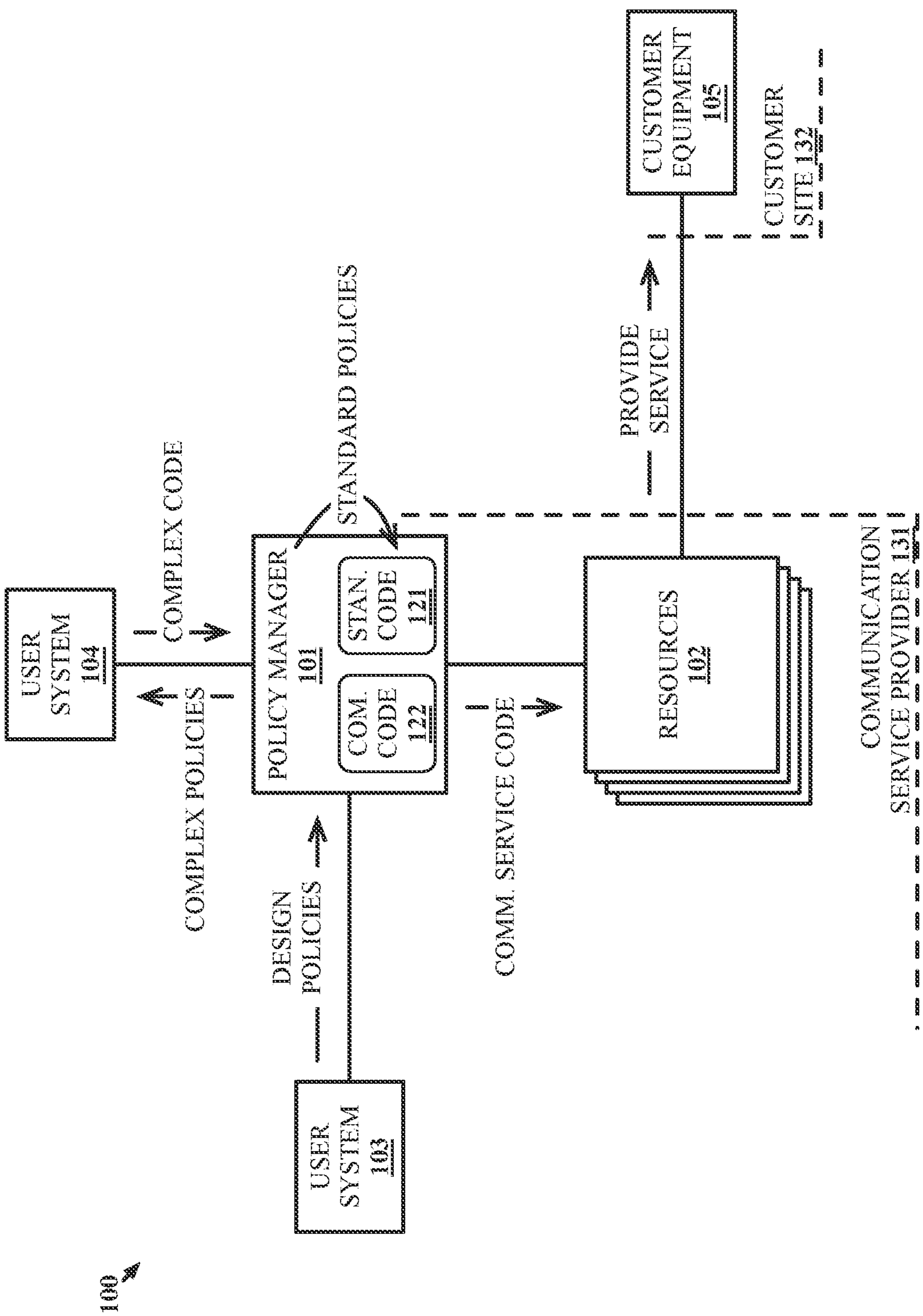
FIG. 1 illustrates an implementation for automatically implementing code to provide a communication service.

FIG. 1 illustrates implementation 100 for automatically implementing code to provide a communication service. Implementation 100 includes policy manager 101, resources 102, user system 103, user system 104, and customer equipment 105. Policy manager 101, resources 102, user system 103, and user system 104 are part of communication service provider 131 and may be collocated or may be distributed across multiple geographic locations (e.g., multiple facilities operated by communication service provider 131). Customer equipment 105 is located at customer site 132 (e.g., a customer's home, office, or other physical location where a customer may desire service from communication service provider 131). Wired and/or wireless communication links connect policy manager 101, resources 102, user system 103, user system 104, and customer equipment 105. While shown as direct links, the communication links may include intervening systems, network, and/or devices.

In operation, policy manager 101 is a computing system that handles the creation of communication service code that will be implemented using resources 102. Policy manager 101 may be a physical server, or virtualized computing system (e.g., virtual machine), executing on physical hardware. In some examples, the functionality of policy manager 101 may be incorporated into user system 103. In this example, user system 103 is operated by a user (e.g., an employee of communication service provider 131) to initiate the design of communication services. User system 103 may be a desktop computer, laptop computer, tablet, smartphone, or some other type of user operable computing device.

User system 103 provides design policies to policy manager 101. A user operating user system 103 may enter the design policies into user system 103, which are then passed to policy manager 101. The design policies define boundaries and instructions for how resources 102 should provide communication services on behalf of communication service provider 131. The policies may indicate multiple options for a feature (e.g., a minimum or maximum connection speed, desired Quality of Service, etc.) and a service design will conform to the design policies.

In this example, policy manager 101 automatically creates standard policy code 121 from standard policies and combines standard policy code 121 with complex policy code received from a developer to create communication service code 122. Communication service code 122 is used to provide communication services to customers. Policy manager 101 transmits communication service code 122 to resources 102 for execution to provide communication services. Resources 102 may include network equipment, billing systems, authentication systems, or any other type of computing system that can provide a desired communication service to customer equipment 105.

Figure 2:
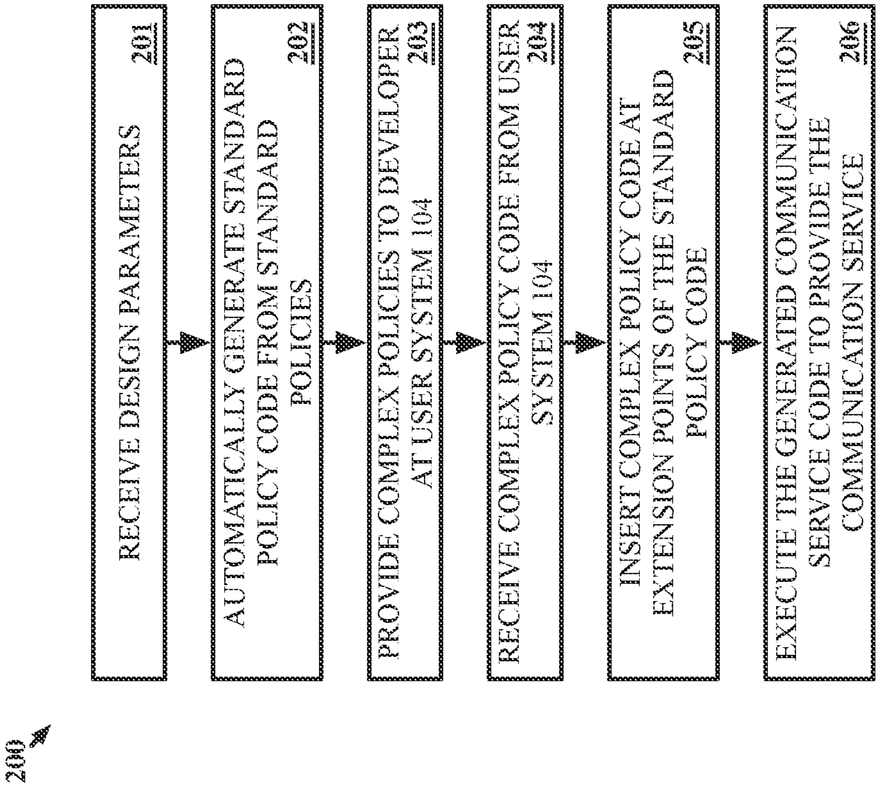
FIG. 2 illustrates an operation to automatically implement code to provide a communication service.

FIG. 2 illustrates operation 200 to automatically implement code to provide a communication service. In operation 200, policy manager 101 receives design policies for providing a communication service (Step 201). The communication service may be a broadband internet service, a voice over internet protocol service, a conferencing service, or some other type of communication service. The design policies include standard policies and complex policies. The standard policies include policies with a predefined set of parameters. For example, the standard policies may include predefined physical connection types, bandwidth speeds, QoS levels, billing considerations, etc. The standard policies may be selected by a user of user system 103 through a software interface on user system 103. The complex policies are policies that cannot be selected from predefined options like the standard policies. Rather, the complex policies are policies that will be implemented by a developer, who is a user with the knowledge to manually draft program code for a communication service. As such, the user of user system 103 may write out the desired complex policies in conversational language expressing to the developer what policy is desired. For example, while a standard policy may place predefined limits on an allowed bandwidth for a communication service, the complex policy may request that the allowed bandwidth change depending on the time of day.

After receiving the design policy manager 101 automatically generates standard policy code 121 for implementing the standard policies (step 202). Given that the standard policies are generated from predefined options, standard policy code 121 may be code that already exists without the predefined options. Thus, policy manager 101 may input the selected options into the existing code to generate standard policy code 121. Other manners of automatically generating standard policy code 121 may also be used. Policy manager 101 includes one or more decoupled extension points in standard policy code 121 such that code implementing the complex policies can be inserted into standard policy code 121 without modifying standard policy code 121. Standard policy code 121 is coded using object-oriented programming and the extension points allow standard policy code 121 to take advantage of polymorphism in object-oriented programming. Java is an example program language where polymorphism can be used, although, other types of programing languages may be used.

Policy manager 101 also provides the complex policies to a developer operating user system 104 (Step 203). The developer is tasked with drafting complex policy code in the same programing language used for standard policy code 121. Specifically, the developer drafts the complex policy code in a manner that can be inserted into standard policy code 121 at the included extension points. In a Java example, the complex policy code may be written to take advantage of method overriding for polymorphism. Method overriding occurs when a subclass inherits a method from a superclass and provides its own implementation of the method. This allows standard policy code 121 to define a common behavior for all subclasses, but also allows the developer to customize the behavior for specific subclasses to implement the complex policies. The developer may also leverage method overloading for polymorphism.

Policy manager 101 receives, from user system 104 of the developer, the complex policy code for implementing the complex policies (Step 204). Policy manager 101 inserts the complex policy code into standard policy code 121 at the decoupled extension points to generate communication service code 122 (Step 205). After insertion to merge standard policy code 121 with the complex policy code, communication service code 122 includes complex policy code that overrides or overloads methods provided in standard policy code 121. Using the example from above regarding bandwidth allowance timing. Standard policy code 121 may include complex policy code at an extension point that overrides the standard policy for bandwidth allowance to be dependent upon a time of day. In some examples, communication service code 122 may be included in one or more service artifacts (e.g., each of resources 102 may receive its own applicable artifact). A service artifact is a software development package stored, shared, and managed in an artifact registry. A service artifact is immutable, ensuring integrity and reliability, and may be identified with a secure hash for authenticity. Service artifacts may be used to deploy and manage services provided by resources 102.

Policy manager 101 executes communication service code 122 to provide a communication service compliant with the design policies therein (step 206). In one example, a customer having customer site 132 with customer equipment 105 may request a communication service be provided via customer equipment 105. Parameters provided by the customer, either directly or through an agent of communication service provider 131, are input into communication service code 122 to provide the communication service to customer equipment 105 with the desired parameters and within the design policies.

Since communication service code 122 merges standard policy code 121 and the complex policy code using the decoupled extension points, modifying either code should not affect the other. For instance, the user of user system 103 may be a business-oriented user with little or no coding expertise, should the user want to change a standard policy, the user may simply select a new option for the standard policies (e.g., may increase the QoS level provided at a certain price point). Policy manager 101 receives the new selection and updates standard policy code 121 while keeping the same extension points with the same complex code thereat. The business-oriented user need not involve the developer to update the standard policy. Likewise, should changes be needed for the complex policies, standard policy code 121 need not be updated. Rather, policy manager 101 may insert new complex policy code from the developer into the extension points of standard policy code 121.

Figure 3:
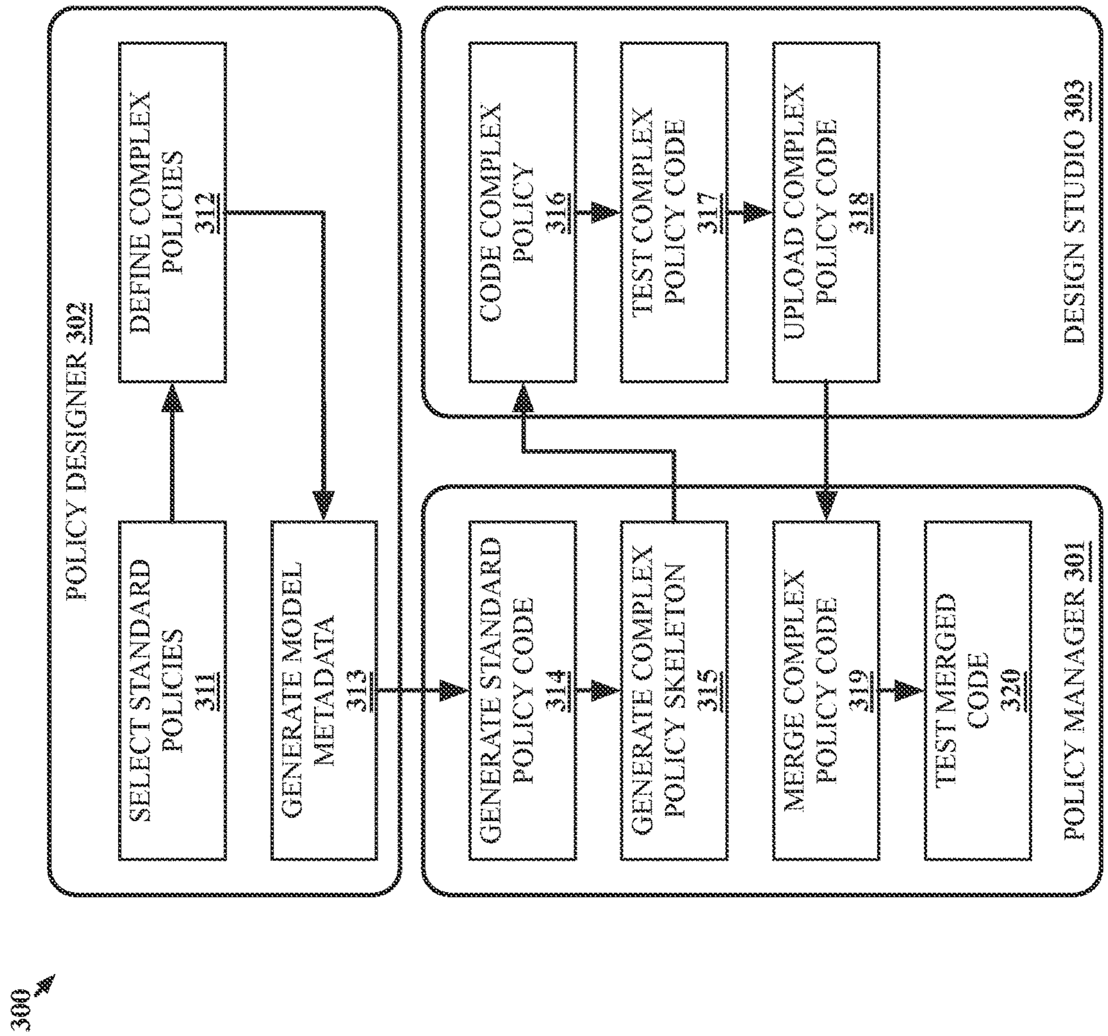
FIG. 3 illustrates an operational scenario for automatically implementing code to provide a communication service.

FIG. 3 illustrates operational scenario 300 for automatically implementing code to provide a communication service. Operational scenario 300 is an example of how different systems of implementation 100 perform operation 200. Policy manager 301 in operational scenario 300 is an example of policy manager 101. Policy designer 302 is software that may be executing on user system 103 for the user to input design policies into user system 103. Design studio 303 is software that may be executing on user system 104 to enable a developer to write complex policy code.

In operational scenario 300, the user selects the desired standard policies for a communication service through a user interface provided by policy designer 302 (Step 311). The user interface is likely a Graphical User Interface (GUI) for ease of use, but other types of interfaces may be used instead. The standard policies may be selected from predefined options for the standard policies. In some examples, the options may allow the user to input a specific value for the standard policies (e.g., the user may be able to input a specific bandwidth limit value rather than having to select from supplied values). The user also defines complex policies into policy designer 302 (Step 312). Policy designer 302 may provide a text input field into which the user may type what complex policies are desired. Typically, a complex policy is any policy that the user could not request via the interface for defining the standard policies. From the standard and complex policies, policy designer 302 generates model metadata describing the policies as a model for providing the communication service (Step 313).

Policy manager 301 receives the model metadata from policy designer 302 and generates the standard policy code therefrom (Step 314). The standard policy code may be generated in any way so as to produce code limiting the provision of the communication service to conform to the standard policies. Regardless, the standard policy code includes decoupled extension points at which complex policy code can be inserted. Policy manager 301 further generates a complex policy skeleton (Step 315). The complex policy skeleton indicates where in the standard policy code the complex policy code should be entered (i.e., the extension points) so a developer can properly implement the desired policy with given method signature.

The developer using design studio 303 uses design studio 303 to code the complex policies based on the skeleton provided by policy manager 301 (Step 316). The developer may test the complex policy code prior to passing the code to policy manager 301 (Step 317). Once the developer is satisfied with the complex policy code (e.g., the code behaved as desired when tested), the developer uses design studio 303 to upload the complex policy code to an object store (Step 318). In other examples, design studio 303 may provide the complex policy code directly to policy manager 301 rather than using the object store.

After policy manager 301 recognizes the complex policy code has been uploaded (e.g., by monitoring the object store or receiving notification of the upload from design studio 303), policy manager 301 merges the complex policy code with the standard policy code (Step 319). Merging the complex policy code may include inserting portions of the complex policy code into the various extension points in the standard policy code, and compiling to ensure extension points are being adhered to by complex policy code. Using the skeleton to draft the complex policy code enables the developer to indicate which portion of the complex policy code should be inserted at which extension point in the standard policy code. Thus, merging may copy the code portion at a particular extension point indicated by the skeleton to the corresponding extension point in the standard policy code. Policy manager 301 may then test the merged code to ensure no errors will occur when providing a communication service based on the merged code (Step 320).

Figure 4:
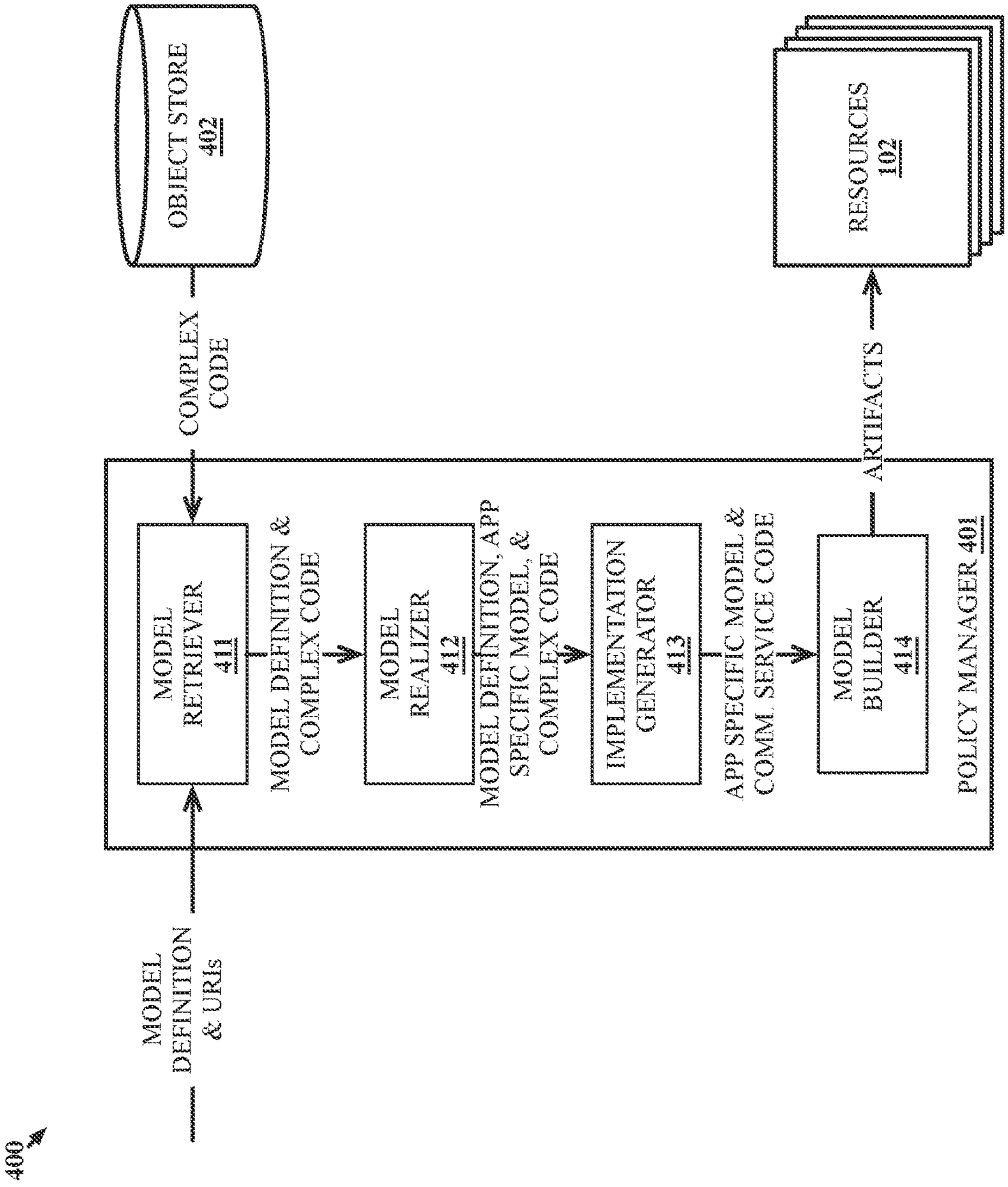
FIG. 4 illustrates an operational scenario for automatically implementing code to provide a communication service.

FIG. 4 illustrates operational scenario 400 for automatically implementing code to provide a communication service. Operational scenario 400 includes policy manager 401, which is another example of policy manager 101. Operational scenario 400 further includes object store 402, which is an object store to which complex policy code may be stored after being completed by a developer. Policy manager 401 includes four components for coding a communication service model, model retriever 411, model realizer 412, implementation generator 413, and model builder 414. Components 411-414 may be implemented as program instructions executing on policy manager 401. In operational scenario 400, model retriever 411 receives a model definition from a business user (e.g., a user operating user system 103 and employed by communication service provider 131 to ensure communication services are provided within the interests of the business). The model definition includes standard policies for policy manager 401 to automatically generate into Java code in this example. Model retriever 411 also receives one or more Uniform Resource Identifiers (URIs). The URIs point to locations on object store 402 where complex policy code is stored. The complex policy code is Java code that was written by a developer prior to being stored on object store 402 based on complex policies in the model definition. The URIs may also be received from the business user or may be received from the developer (e.g., via user system 104). In some examples, model retriever 411 may use credentials provided along with the URIs to authenticate itself to object store 402 as being authorized to access the complex policy code.

Model retriever 411 passes the model definition and the retrieved complex policy code to model realizer 412. Model realizer 412 determines application specific models for the standard policies set forth in the model definition. Various applications in resources 102 may need to be configured to implement the standard policies in the model definition. Model realizer 412 determines which portions of the policy model applies to each specific application. For example, there may be an inventory application, an order management application, an activation application, or some other application in resources 102 that provides communication services. In that example, an inventory application may be a software system of resources 102 that tracks the stock levels of products and materials that provide the service, such as modems, routers, and other equipment that is used to provide communications service to customers. An order management application is a software system of resources 102 that manages the process of ordering and fulfilling orders. An order management application may manage the process of ordering and fulfilling orders for the communication service, including tasks such as verifying customer eligibility, processing payments, and scheduling installations. An activation application is a software system of resources 102 that activates the communication service for customers. An activation application may activate customer equipment 105 and assign a unique IP address.

Model realizer 412 provides the original model definition, the application specific models, and the complex policy code to implementation generator 413. Implementation generator 413 generates standard Java policy code for the standard policies in the model definition and inserts the complex Java policy code at extension points therein using the override method of polymorphism in the extended Java class. The resultant code is referred to as the communication service code for providing the communication service. In an example, a standard design policy in the model definition may indicate that, if a download speed of the communication service is greater than 500 Mbps, then DOCSIS (Data Over Cable Service Interface Specification) should be used to provide the service. Otherwise, DSL (Digital Subscriber Line) should be used. The standard Java policy code generated by implementation generator 413 would be the base Java class. An extension point to the base Java class enables the standard policy to be overridden by a portion of the complex Java code (i.e., the extended class). For example, the extended class may enable DOCSIS to be used for lower speeds when customer equipment 105 is located farther than a threshold distance from a central office.

Implementation generator 413 passes the communication service code and the application specific models to model builder 414. Model builder 414 processes the application specific models and the communication service code to compile and build service artifacts with the Java classes of the communication service code embedded inside. Model builder 414 may also package the service artifacts into an archive and store them in a storage system similar to object store 402. A service administrator may download the service artifacts to their systems using Representational State Transfer (REST). A service administrator, when rolling out a new communication service to a customer, can retrieve the artifacts and implement the artifacts on resources 102 with the parameters provided by the customer. For example, the parameters may include a desired internet speed and that desired speed may be entered so that the policy code can select DSL or DOCSIS. Also, model builder 414 may package the workspace used to generate communication service code into an archive and make it available via REST so that a developer can retrieve and use the code as a starting point to implement the intent of the complex design policies.

Figure 5:
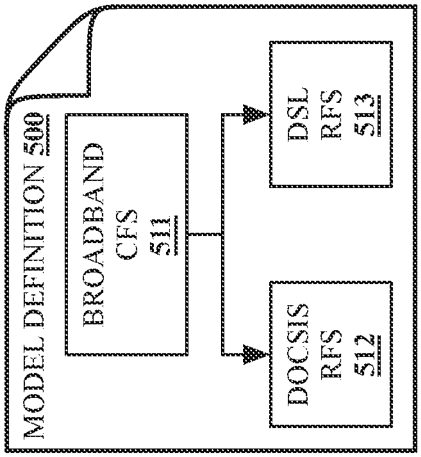
FIG. 5 illustrates a model definition for automatically implementing code to provide a communication service.

FIG. 5 illustrates model definition 500 for automatically implementing code to provide a communication service. Model definition 500 is an example model definition that may be provided to model retriever 411 in operational scenario 400. Model definition 500 represents the standard policy mentioned above where a policy for broadband customer facing service (CFS) 511 directs the broadband service to either DOCSIS resource facing service (RFS) 512 or DSL RFS 513. Broadband CFS 511 represents a desired speed requested by a customer. The standard policy indicates whether DOCSIS RFS 512 or DSL RFS 513 should be used to provide broadband CFS 511 based on the desired speed. Specifically, that DOCSIS RFS 512 should be used for speeds greater than 500 Mbps and DSL RFS 513 for speeds under 500 Mbps.

Figure 6:
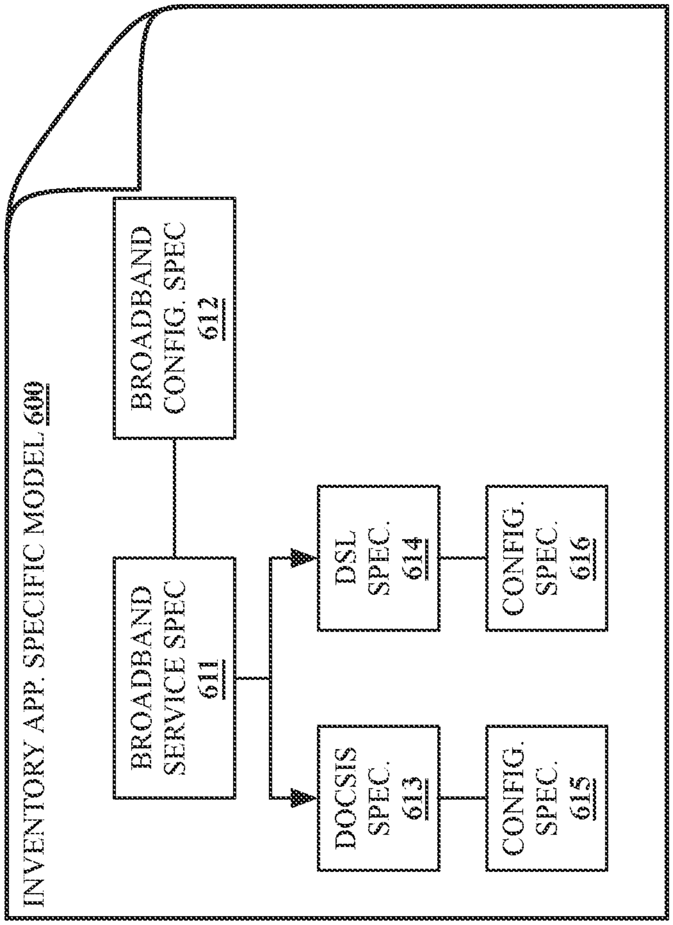
FIG. 6 illustrates an application specific model definition for automatically implementing code to provide a communication service.

FIG. 6 illustrates application specific model 600 definition for automatically implementing code to provide a communication service. In this case, application specific model 600 is a model for an inventory application. Application specific model 600 includes broadband service specification 611, which branches to DOCSIS specification 613 and DSL specification 614 depending on which speed is requested by the customer. DOCSIS configuration specification 615 and DSL configuration specification 616 then branch from DOCSIS specification 613 and DSL specification 614 to specify the necessary equipment configurations necessary to provide the requested speed. Application specific model 600 also includes broadband configuration specification 612, which may define other configurations for the provision of broadband service independent of whether DOCSIS or DSL is used.

Figure 7:
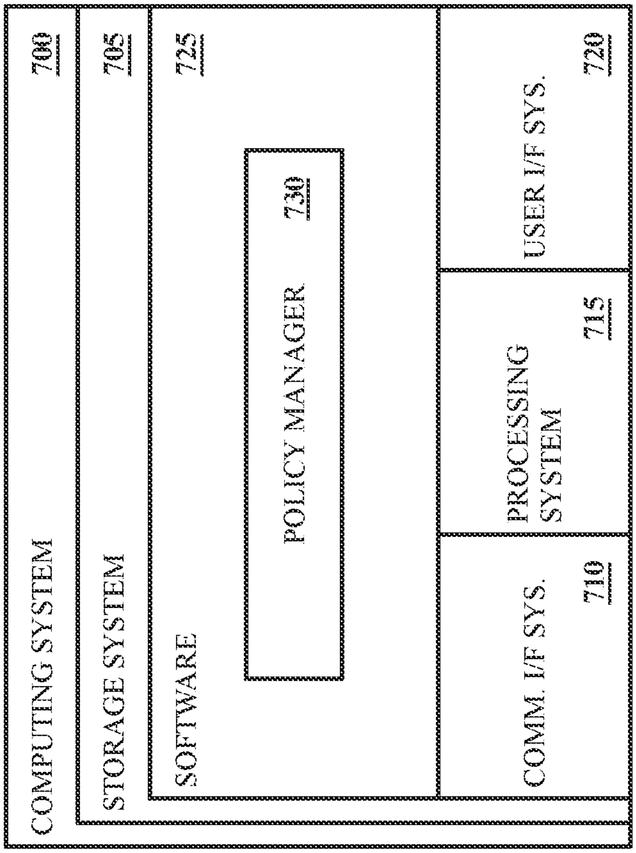
FIG. 7 illustrates a computing system for automatically implementing code to provide a communication service.

FIG. 7 illustrates a computing system 700 that is representative of any system or collection of systems in which the various processes, systems, programs, services, and scenarios disclosed herein may be implemented. Examples of computing system 700 include, but are not limited to, desktop computers, laptop computers, server computers, routers, web servers, cloud computing platforms, and data center equipment, distributed computing systems, as well as any other type of physical or virtual server machine, physical or virtual router, container, and any variation or combination thereof. It should be understood virtualized components are executing on physical hardware like that of computing system 700.

Computing system 700 may be implemented as a single apparatus, system, or device or may be implemented in a distributed manner as multiple apparatuses, systems, or devices. Computing system 700 may include, but is not limited to, processing system 715, storage system 705, software 725, communication interface system 710, and user interface system 720. Processing system 715 may be operatively coupled with storage system 705, communication interface system 710, and user interface system 720.

Processing system 715 may load and execute software 725 from storage system 705. Software 725 may include and implement policy manager 730, which may be representative of any of the operations for designing and providing a communication service (e.g., operation 200). Accordingly, computing system 700 may be policy managers 101, 301, 401 or may be a host system for a virtualized example of the policy managers. Computing system 700 may also represent other computing systems described herein, such as resources 102, user system 103, user system 104, and customer equipment 105—including combinations thereof. When executed by processing system 715, software 725 may direct processing system 715 to operate as described herein for at least the various processes, operational scenarios, and sequences discussed in the foregoing implementations. Computing system 700 may optionally include additional devices, features, or functionality not discussed for purposes of brevity.

In some embodiments, processing system 715 may comprise a micro-processor and other circuitry that retrieves and executes software 725 from storage system 705. Processing system 715 may be implemented within a single processing device but may also be distributed across multiple processing devices or sub-systems that cooperate in executing program instructions. Examples of processing system 715 may include general purpose central processing units, graphical processing units, application specific processors, and logic devices, as well as any other type of processing device, combinations, or variations thereof.

Storage system 705 may comprise any memory device or computer readable storage media readable by processing system 715 and capable of storing software 725. Storage system 705 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a transitory form of signal transmission (often referred to as "signals per se"), such as a propagating electrical or electromagnetic signal or carrier wave.

In addition to computer readable storage media, in some implementations storage system 705 may also include computer readable communication media over which at least some of software 725 may be communicated internally or externally. Storage system 705 may be implemented as a single storage device but may also be implemented across multiple storage devices or sub-systems co-located or distributed relative to each other. Storage system 705 may comprise additional elements, such as a controller, capable of communicating with processing system 715 or possibly other systems.

Software 725 (including process 730 among other functions) may be implemented in program instructions that, when executed by processing system 715, direct processing system 715 to operate as described with respect to the various operational scenarios, sequences, and processes illustrated herein. For example, software 725 may include program instructions for receiving design policies, including standard and complex policies, for providing the communication service, automatically generating the standard policy code with one or more decoupled extension points for implementing the standard policies, providing the complex policies to a developer, receiving, from the developer, the complex policy code for implementing the complex policies, inserting the complex policy code into the standard policy code at the decoupled extension points to generate communication service code, and executing the communication service code to provide the communication service.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 725 may include additional processes, programs, or components, such as operating system software, virtualization software, or other application software. Software 725 may also comprise firmware or some other form of machine-readable processing instructions executable by processing system 715.

In general, software 725 may, when loaded into processing system 715 and executed, transform a suitable apparatus, system, or device (of which computing system 700 is representative) overall from a general-purpose computing system into a special-purpose computing system customized to act, for example, as a slice breather or the like as described herein. Indeed, encoding software 725 on storage system 705 may transform the physical structure of storage system 705. The specific transformation of the physical structure may depend on various factors in different implementations of this description. Examples of such factors may include, but are not limited to, the technology used to implement the storage media of storage system 705 and whether the computer-storage media are characterized as primary or secondary storage, as well as other factors.

For example, if the computer readable storage media are implemented as semiconductor-based memory, software 725 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 710 may include communication connections and devices that allow for communication with other computing systems (not shown) over communication networks (not shown). Examples of communication connections and devices that together allow for inter-system communication may include network interface cards, antennas, power amplifiers, radio-frequency (RF) circuitry, transceivers, and other communication circuitry. The communication connections and devices may communicate over communication media to exchange communications with other computing systems or networks of systems, such as metal, glass, air, or any other suitable communication media.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the only system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for combining standard policy code with complex policy code to implement a communication service, the method comprising:

receiving design policies for providing the communication service, wherein the design policies include standard policies and complex policies;

automatically generating the standard policy code for implementing the standard policies, wherein one or more decoupled extension points are included in the standard policy code;

providing the complex policies to a developer;

receiving, from the developer, the complex policy code for implementing the complex policies;

inserting the complex policy code into the standard policy code at the decoupled extension points to generate communication service code; and executing the communication service code to provide the communication service.

2. The method of claim 1, comprising:

receiving updated standard policies; and automatically updating the standard policy code based on the update, wherein the standard policy code retains the decoupled extension points at which the complex policy code is inserted.

3. The method of claim 1, comprising:

receiving updated complex policies;

providing the updated complex policies to the developer;

receiving, from the developer, updated complex policy code; and inserting the updated complex policy code into the standard policy code at the decoupled extension points to generate updated communication service code.

4. The method of claim 1, wherein receiving the design policies comprises:

receiving a model definition including the standard policies and custom implementation Uniform Resource Identifiers (URIs); and retrieving the complex policies from an object store using the URIs.

5. The method of claim 1, comprising:

realizing the design policies into an application specific model, wherein the application specific model formats the design policies into a format corresponding to an application that will implement the communication service.

6. The method of claim 5, wherein automatically generating the standard policy code comprises:

generating a Java base class and including code for one of the standard policies in the Java base class, wherein the Java base class includes the extension points.

7. The method of claim 6, wherein inserting the complex policy code into standard policy code comprises:

including an extension class from the complex policy code at one of the decoupled extension points in the Java base class.

8. The method of claim 7, wherein executing the communication service code comprises:

compiling service artifacts including the Java base class and the extension class.

9. The method of claim 8, comprising:

providing the service artifacts to endpoints using Representational State Transfer (REST).

10. An apparatus to combine standard policy code with complex policy code to implement a communication service, the apparatus comprising:

one or more computer readable storage media;

a processing system operatively coupled with the one or more computer readable storage media; and program instructions stored on the one or more computer readable storage media that, when read and executed by the processing system, direct the apparatus to:

receive design policies for providing the communication service, wherein the design policies include standard policies and complex policies;

automatically generate the standard policy code for implementing the standard policies, wherein one or more decoupled extension points are included in the standard policy code;

provide the complex policies to a developer;

receive, from the developer, the complex policy code for implementing the complex policies;

insert the complex policy code into the standard policy code at the decoupled extension points to generate communication service code; and execute the communication service code to provide the communication service.

11. The apparatus of claim 10, wherein the program instructions direct the processing system to:

receive updated standard policies; and automatically update the standard policy code based on the update, wherein the standard policy code retains the decoupled extension points at which the complex policy code is inserted.

12. The apparatus of claim 10, wherein the program instructions direct the processing system to:

receive updated complex policies;

provide the updated complex policies to the developer;

receive, from the developer, updated complex policy code; and insert the updated complex policy code into the standard policy code at the decoupled extension points to generate updated communication service code.

13. The apparatus of claim 10, wherein to receive the design policies, the program instructions direct the processing system to:

receive a model definition including the standard policies and custom implementation Uniform Resource Identifiers (URIs); and retrieve the complex policies from an object store using the URIs.

14. The apparatus of claim 10, wherein the program instructions direct the processing system to:

realize the design policies into an application specific model, wherein the application specific model formats the design policies into a format corresponding to an application that will implement the communication service.

15. The apparatus of claim 14, wherein to automatically generate the standard policy code, the program instructions direct the processing system to:

generate a Java base class and including code for one of the standard policies in the Java base class, wherein the Java base class includes the extension points.

16. The apparatus of claim 15, wherein to insert the complex policy code into standard policy code, the program instructions direct the processing system to:

include an extension class from the complex policy code at one of the decoupled extension points in the Java base class.

17. The apparatus of claim 16, wherein to execute the communication service code, the program instructions direct the processing system to:

compile service artifacts including the Java base class and the extension class.

18. The apparatus of claim 17, wherein the program instructions direct the processing system to:

provide the service artifacts to endpoints using Representational State Transfer (REST).

19. One or more non-transitory computer-readable storage media having program instructions stored thereon for combining standard policy code with complex policy code to implement a communication service, the program instructions, when read and executed by a processing system, direct the processing system to:

receive design policies for providing the communication service, wherein the design policies include standard policies and complex policies;

automatically generate the standard policy code for implementing the standard policies, wherein one or more decoupled extension points are included in the standard policy code;

provide the complex policies to a developer;

receive, from the developer, the complex policy code for implementing the complex policies;

insert the complex policy code into the standard policy code at the decoupled extension points to generate communication service code; and execute the communication service code to provide the communication service.

20. The one or more non-transitory computer-readable storage media of claim 19, wherein the program instructions direct the processing system to:

receive updated standard policies; and automatically update the standard policy code based on the update, wherein the standard policy code retains the decoupled extension points at which the complex policy code is inserted.

* * * * *